Figure 1:
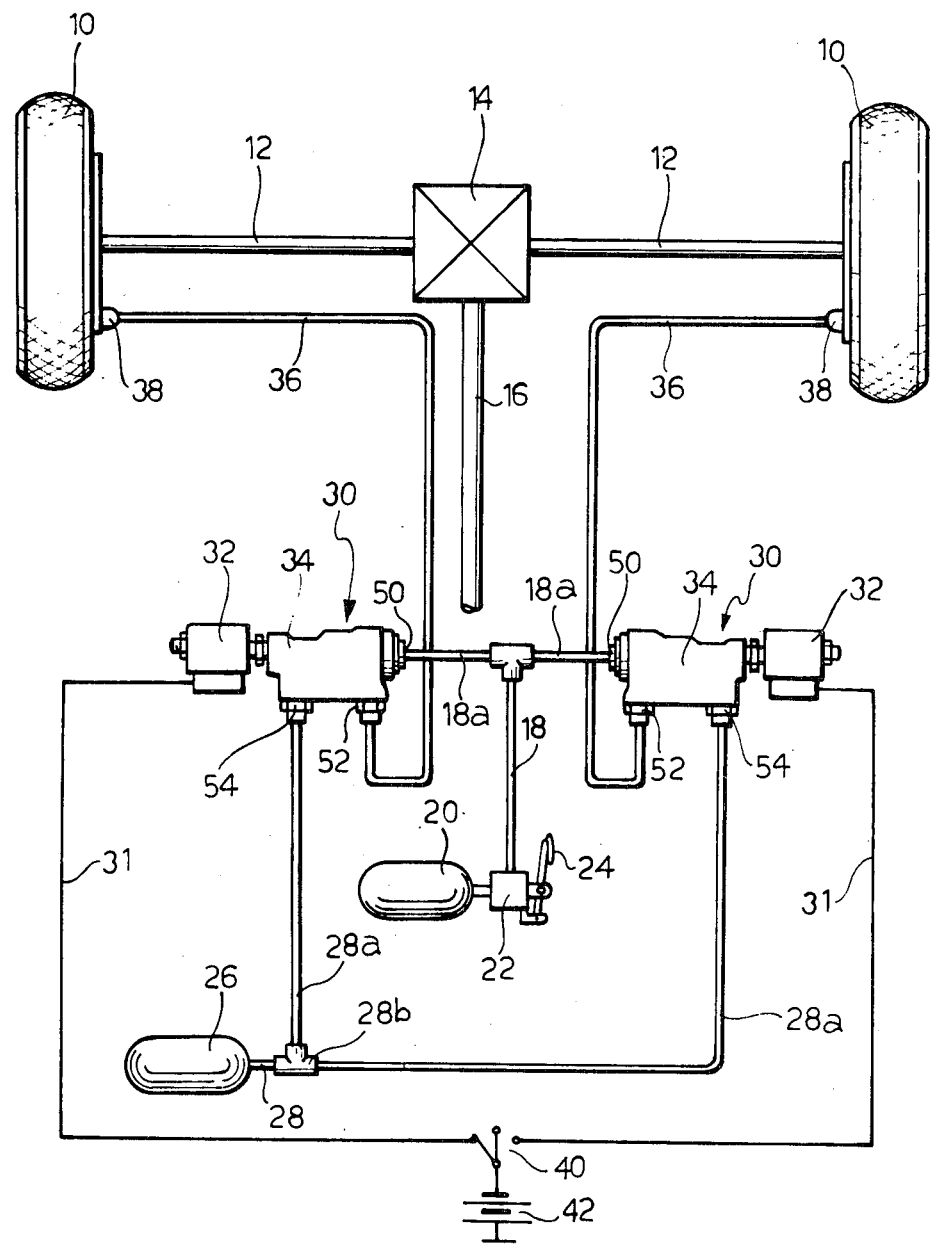

United States Patent [19]

Maggioni et al.

[11] 4,078,846
[45] Mar. 14, 1978

[54] FLUID DISTRIBUTION VALVE FOR A MOTOR VEHICLE BRAKING SYSTEM

[75] Inventors: Virginio Maggioni, Rosta (Turin); Enrico Rivetti, Turin, both of Italy

[73] Assignee: FIAT Societa per Azioni, Turin, Italy

[21] Appl. No.: 732,257

[22] Filed: Oct. 14, 1976

[30] Foreign Application Priority Data

Oct. 31, 1975   Italy ............................. 69707 A/75

[51] Int. Cl.² .............................................. B60T 8/02
[52] U.S. Cl. .................................. 303/119; 303/84 A
[58] Field of Search ................... 303/96, 98, 113–119, 303/68–69, 61–63, 84 A, 6 R, 6 A, 13, 6 C; 188/181 A, 181 R, 349; 251/30; 180/82 R

[56] References Cited

U.S. PATENT DOCUMENTS

| 3,529,871 | 9/1970 | Burckhardt et al. | 303/119 |
| 3,532,391 | 10/1970 | Klein | 303/119 |
| 3,843,211 | 10/1974 | Ingram et al. | 303/115 |
| 3,891,278 | 6/1975 | Grosseau | 303/119 |
| 3,920,282 | 11/1975 | DeVlieg | 303/119 |

Primary Examiner—Trygve M. Blix
Assistant Examiner—Douglas C. Butler

Attorney, Agent, or Firm—Sughrue, Rothwell, Mion, Zinn and Macpeak

[57] ABSTRACT

A fluid operated braking system for a motor vehicle, having a main braking circuit for applying braking pressure to the actuators of both wheels of at least one axle of the vehicle and a subsidiary braking circuit for applying a reduced braking pressure to one of the wheels of the axle if it should enter a skid or incipient skid state, in which the subsidiary braking circuit is controlled by two distributors each of which has three ports, one connected to the main braking circuit, one connected to the subsidiary braking circuit, and one connected to the brake actuator of an associated wheel of the axle, the distributor being controlled by an electrovalve to connect the main braking pressure circuit to the brake actuator of the associated wheel of the axle under normal condition and to connect the subsidiary braking circuit, through an internal path within the distributor to the brake actuator of one wheel of the axle when this wheel enters a skid or incipient skid state, without affecting the distributor associated with the other wheel of the axle. This internal path in the distributor includes elements which produce a varying resistance to the passage of fluid thereby permitting a gradually increasing brake pressure to be applied to the skidding wheel.

4 Claims, 3 Drawing Figures

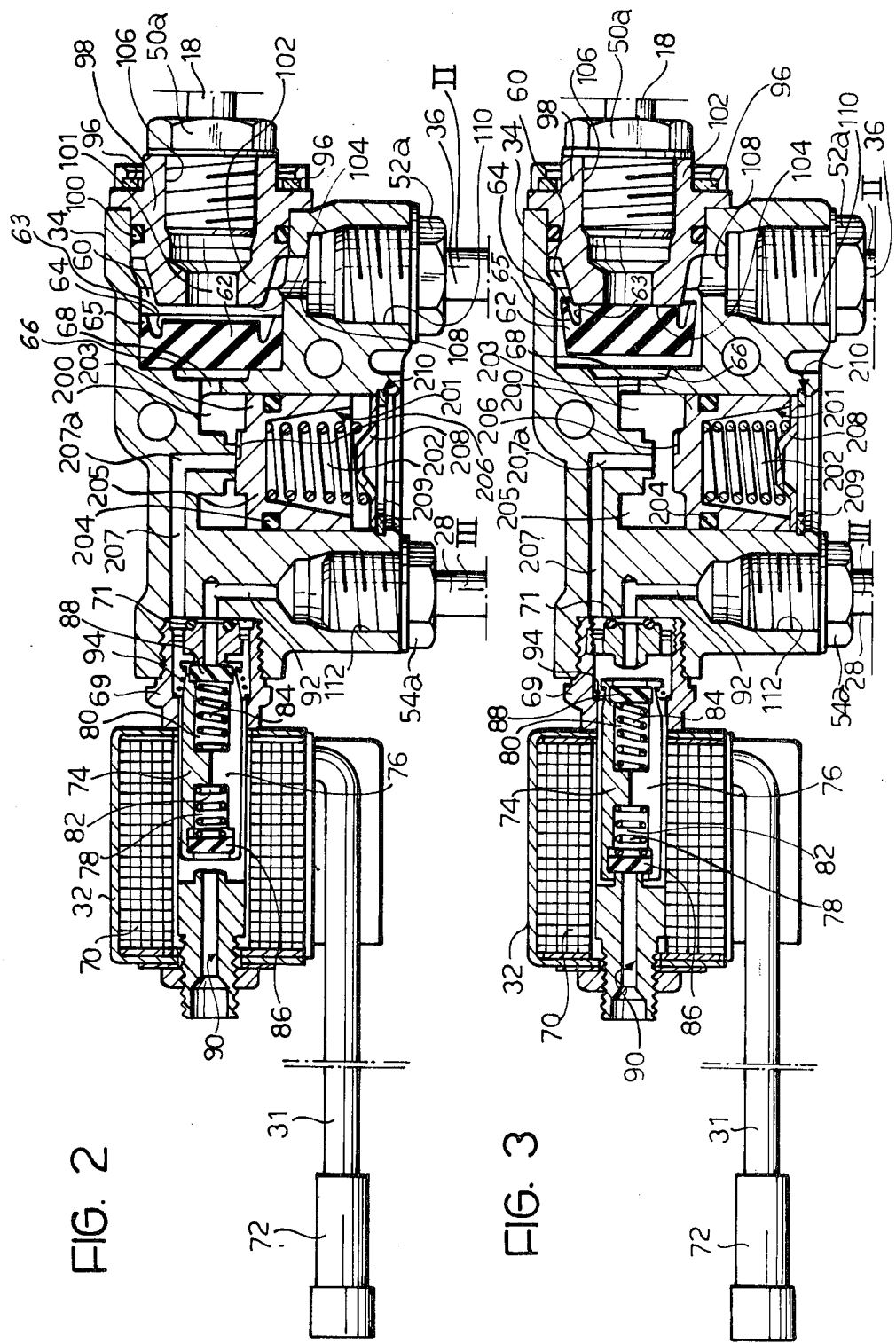

FLUID DISTRIBUTION VALVE FOR A MOTOR VEHICLE BRAKING SYSTEM

The present invention relates to a motor vehicle braking system, and particularly to a braking system which, in conditions of low adhesion, when upon braking one or more wheels of the vehicle may start to skid, nevertheless allows the transmission of braking torque to the non-skidding wheels of the vehicle.

The present invention is an improvement of a motor vehicle braking system of the type comprising means for applying braking pressure to brake actuators of both wheels of an axle for simultaneous braking of the two wheels of the said axle, and means for applying a reduced braking pressure to one of the wheels of the axle if its dynamic state approaches a skid or incipient skid state, while continuing to apply the full braking pressure to the other wheel of the axle if it is not in a skid or an incipient skid state, this including electrically controlled distribution means, associated with each of the two wheels.

In braking systems of the above-mentioned type, the electrically controlled distribution means, associated with each of the two wheels of the axle under consideration, since they act on the main braking circuit, must have ports and passages equal in size to those of the main brake pipe so as not to cause delays in braking when the system is operating normally, furthermore, they must also be provided with an electrical control device of considerable power and size.

The present invention seeks to provide a braking system of the general type described above, in which the electrically controlled distribution means associated with each of the two wheels of the axle, control ducts of smaller dimensions than the ducts of the main braking circuit and which, therefore, require less power for their operation than conventional devices known in the art.

According to the present invention, there is provided a fluid operated motor vehicle braking system for at least two wheels of one axle of the vehicle, of the type comprising means for applying braking pressure to brake actuators of both wheels of the said axle for simultaneous braking of the two wheels of the said axle, and means for applying a reduced braking pressure to one of the wheels of the axle if its dynamic state approaches a skid or incipient skid state, while continuing to apply the full braking pressure to the other wheel of the axle if it is not in a skid or an incipient skid state, this including electrically controlled distribution means associated with each of the two wheels, characterised in that the said distribution means associated with each wheel comprise an electrovalve for controlling a distributor having a first connector union for connection to a circuit including a main source of braking pressure, a second connector union for connection to a brake pipe leading to the brake actuator of an associated wheel a third connector union for connection to a conduit leading to an auxiliary source of braking pressure, the distributor also having a main chamber in which is slidingly housed a main valve shutter which separates the main chamber into first and second compartments, the first compartment communicating with both the first and the second connector unions, and the second compartment communicating, via a communication passage with the electrovalve with which the said third connector union also communicates, the said communication passage between the electrovalve and the said main chamber incorporating subsidiary control means for varying the minimum cross sectional area of the said communication passage, and the electrovalve having a valve shutter which closes communication between the said third connector union and the said second compartment of the main chamber when the electrovalve is in a first operating position and which opens such communication when the electrovalve is in a second operating position, the said main shutter being displaced by pressure in the said second compartment when the electrovalve is in said second operating position to close communication between the said first and second connector unions and to open communication between the said third and second connector unions.

One embodiment of the present invention will now be more particularly described, by way of example, with reference to the accompanying drawings, in which:

FIG. 1 is a schematic diagram illustrating a motor vehicle braking system formed as an embodiment of the present invention; and FIGS. 2 and 3 are longitudinal sections of a part of the braking system illustrated in FIG. 1, in two different operating positions.

Referring now to the drawings, and particularly to FIG. 1, there is shown a braking circuit for two driving wheels 10 of one axle (indicated 12) which are driven through a differential gear 14 from a transmission shaft 16.

A main compressed air reservoir 20 feeds a control valve 22 which is controlled by a pedal 24 operable by the driver of the vehicle. Upon depression of the brake pedal 24 compressed air is fed through the valve 22 into a main brake pipe 18 which communicates with two branch pipes 18a. Each of the brake pipes 18a feeds a respective distribution device 30. Each of the distribution devices 30 comprises a distributor valve arrangement 34 controlled by an electromagnetically operated valve 32, hereinafter termed an electrovalve. The electrovalves 32 are connected by wires 31 to a two pole switch 40 which, in dependence on its position, feeds one or other of the electrovalves 32 with current from a source 42. The distributor valves 34 have three connector unions, a first union 50 connecting the distributor 34 to the pipe 18 from the brake pedal 24, a second union 52 connecting the distributor 34 to a brake pipe 36 leading to a brake actuator 38 of a respective wheel 10, and a third union 54 connecting the distributor 34 to a pipe 28a connected at a T-junction 28b to a pipe 28 leading from an auxiliary compressed air reservoir 26.

One of the distribution devices 30, which are both identical, is shown in FIGS. 2 and 3.

The distributor 34 has a die-cast aluminium alloy body defining a main chamber 60 along which slides a main valve shutter body 62, and an auxiliary chamber 200 in which slides an auxiliary valve shutter body 201. The main valve shutter body separates the main chamber 60 into two compartments one of which, 64, communicates with both the first union 50 and the second union 52 of the distributor. The other compartment 66 of the main chamber 60 communicates through a passage 68 with the auxiliary chamber 200, which in turn communicates through a passage 207, 207a with the electrovalve 32.

The electrovalve 32 has a threaded projection 69 by means of which it is fixed to the body of the distributor 34; a sealing ring 71 seals the connection against leakage. The electrovalve 32 has a winding 70, fed through a cable 31, provided with a connector 72 for electrical connection to the switch 40. Housed within the winding 70 is a movable core 74 of cylindrical form, in which there are two cavities 78 and 80 housing springs 82, 84. Along the body of the core 74 is a deep longitudinal groove 76. The core 74 is provided at each end with a respective disc-type valve shutter 86, 88 each of which is urged axially toward the end of the core 74 by respective springs 82 and 84.

The valve shutter 86 controls the flow of fluid through a hole 90 in the core 74, which communicates with the atmosphere, and the valve shutter 88 controls the flow of fluid through a passage 92 in the distributor communicating with the third union 54 of the distributor 34.

In FIG. 2 the electrovalve 32 is shown de-energized; in this condition a spring 94 biases the core 74 to the right of the drawing whereby the shutter 88 cuts off the passage 92, whereas the compartment 68 communicates with the atmosphere through the subsidiary chamber 200, the passage 207, the longitudinal groove 76 and the bore 90.

The main valve shutter 62 in the main chamber 60 is made of a resilient material, in the form of a truncated cone the smaller end of which has the same diameter as the main chamber 60 and the larger end of which is somewhat larger than this so that the main shutter 62 is held under compression in the main chamber 60. The larger face of the main shutter faces the compartment 64 of the main chamber 60 and has an annular groove 63 in it which defines a peripheral sealing lip 65 which, due to the above mentioned compression, is pressed against the wall of the chamber 60.

The subsidiary shutter 201 in the subsidiary chamber 200 has a generally cup shape body 203 externally provided with a sealing ring 204 which seals the interface between the shutter 201 and the internal surface of the chamber 200. The cup shaped shutter 201 has a base 205 which is generally flat but has a raised central boss with a radial notch 206 which communicates with the outlet of a branch passage 207a of the passage 207: the notch 206 has a smaller transverse section than that of the passage 207. The base 205 of the cup shaped body 203 is pressed against the mouth of the passages 207a by a biasing spring 202, housed within the cup shaped body 203; one end of the spring 202 presses against the inner face of the base 205 and the other end of the spring 202 presses against a cap 208 which is kept in position by a circlip 209 snap inserted in an annular groove 210 in the body 34 of the distributor.

Closing the end of the first compartment 64 of the main chamber 60, and fixed to the body 34 by means of bolts 96, is an inlet pipe connector 98, provided with a central longitudinal through hole 101. The inner end 102 of the connector 98 is substantially in the form of a truncated cone which projects into the main chamber 60 so that its end face 104 can cooperate with the adjacent face of the main shutter 62. The inlet pipe connector 98 also has a threaded hole 106 in to which is screwed a pipe union 50.

In the body 34 of the distributor, and extending orthogonally with respect to the longitudinal axis of the inlet pipe union 50, is a threaded hole 110 which communicates through a small passage 108 with the main chamber 60. Into the hole 110 is screwed a pipe union 52.

Parallel to the hole 110 in the body 34 there extends another threaded hole 112 into which is screwed a pipe union 54a which connects the subsidiary brake pipe 28 with the passage 92.

The device described above operates as follows: when the electrovalve is de-energised, as shown in FIG. 2, that is upon normal braking with the system, when neither of the wheels 10 of the axle under consideration are in a skid or an incipient skid state, the brake actuator 38 of the associated wheel 10 is directly fed from the main braking circuit 18, 18a, since the first and second unions 50, 52 communicate with one another through the first compartment 64 of the main chamber 60.

Compressed air from the main reservoir 20 is delivered through the valve 22 controlled by the brake pedal 24 to the pipe 18, and from there passes to the branch pipes 18a. It enters the first compartment 64 of the main chamber 60 through the hole 101 of the inlet connector 98 and, because of the pressure difference between the two compartments 64, 66 of the main chamber 60 the main shutter body 62 obstructs the passage 68 which is connected to the atmosphere through the subsidiary chamber 200, the notch 206 in the subsidiary shutter 205, the passage 207, 207a the longitudinal groove 76 in the core 74 of the electrovalve, and the outlet hole 90. The electrovalve 32 is not energised and therefore the shutter 88 closes the union 54 fed with compressed air from the subsidiary reservoir 26 and the main chamber 60.

If, on the other hand one of the wheels 10 enters a skid or incipient skid state, the switch 40 is thrown to one or other of its contact positions and energises the electrovalve 32 of the distributor 30 associated with the skidding wheel by feeding current to the associated winding from the battery 42. FIG. 3 illustrates this condition; energisation of the winding 70 causes the core 74 to be drawn in until the valve shutter 86 closes the hole 90 communicating with the atmosphere. This movement of the core 74 lifts the shutter 88 at the other end thereof away from the mouth of the passage 92 establishing communication between the passage 92 and the passage 207. Compressed air from the subsidiary reservoir 26 entering the distributor through the union 54 can then flow along the passages 207 and 207a and via the notch 206 and the passage 68 into the second compartment of the main chamber 60. The main shutter is thus pressed against the mouth of the passage 101 in the inlet union 98 closing off communication between the main braking pressure source 20 and the brake actuator 32 of the associated wheel 10. With the fall in pressure in the first compartment 64 of the main chamber 60 the lips of the main shutter become deformed due to the pressure difference across the shutter 62 (now greater in the second compartment 66 than in the first compartment 64), allowing compressed air to leak past between the lip 65 of the shutter 62 and the walls of the main chamber 60. This compressed air then passes through the outlet union 52 to the brake actuator 38 of the associated wheel.

The increase of pressure applied to the brake actuators 38 is initially very slow because the notch 206 acts as a restrictor throttle allowing only a very small flow of air. Regulation of the pressure increase is also effected by the main shutter 62 due to the resistance of the resilient lip 65 thereof, which allow the passage of only a limited amount of air through the space between the internal surface of the main chamber 60 and the lip 65. As the pressure in the subsidiary chamber 200 increases, however, the subsidiary shutter 201 is forced against the action of the spring 202 away from the mouth of the passage 207a allowing the braking pressure applied to the actuator 38 to rise more rapidly due to the increase in cross sectional area of the restricting part of the passage. Therefore the pressure rises much faster (the precise gradient depending on the calibration of the spring 202 and the area of the base 205 of the shutter 201, and the dimensions of the notch 206). When the wheel 10 which was in a skid or incipient skid state has recovered its normal dynamic state the electrovalve 32 is de-energised by movement of the switch 40 thus stopping the anit-skid action and restoring the distributor device to its initial condition in which the passage 92 is cut off and the passage 207 is put in communication with the atmosphere; the main shutter 62 is then again displaced by the effect of the pressure difference across the two compartments 64, 66 of the main chamber 60, reopening the hole 100 of the inlet union 50; the subsidiary shutter 201 is displaced by the spring 202 back to its initial position where it shuts off the passage 207a apart from the small notch 206.

What is claimed is:

1. In a fluid operated motor vehicle braking system for at least two wheels of one axle of the vehicle, of the type comprising:

a main braking pressure generating means, means for applying braking pressure from said main braking pressure generating means to brake actuators of both wheels of said axle for simultaneous braking of said two wheels of said axle, and means for applying a reduced braking pressure generated by an auxiliary braking pressure generating means to one of said wheels of said axle if its dynamic state approaches a skid or incipient skid state, while continuing to apply the full braking pressure to the other wheel of said axle if it is not in a skid or an incipient skid state, the improvement wherein:

said means for applying a reduced braking pressure comprises:

distribution means associated with each wheel of said axle, said distribution means including, an electrovalve, a distributor, a first connector union of said distributor for connection to said main braking pressure generating means, a second connector union for connection to a brake pipe leading to the brak actuator of an associated wheel of said axle, a third connection union for connection to a conduit leading to said auxiliary braking pressure generating means, a main chamber of said distributor, a main valve shutter slidingly housed in said main chamber and separating said main chamber into first and second compartments, said first compartment communicating with both said first and said second connector unions, and said second compartment communicating with a communication passage leading to said electrovalve, said third connector union also communicating with said electrovalve, subsidiary control means in said communication passage between said electrovalve and said main chamber for varying the minimum cross sectional area of said communication passage, a valve shutter of said electrovalve closing communication between said third connector union and said second compartment of said main chamber when said electrovalve is in a first operating position and opening such communication when said electrovalve is in a second operating position, said main shutter being displaced by pressure in said second compartment of said main chamber when said electrovalve is in said second operating position to close communication between said first and said second connector unions and to open communication between said third and said second connector unions.

2. A braking system as in claim 1, wherein said main shutter is made of resilient material, in the form of a truncated cone, having larger and smaller ends which respectively face said first compartment and said second compartment of said main chamber, an annular groove in said larger end of said main shutter defining a resilient peripheral lip which permits fluid to flow from said second compartment to said first compartment of said main chamber but which prevents the flow of fluid from said first to said second compartment.

3. A braking system as in claim 1, wherein said subsidiary control means operable to vary the minimum cross sectional area of said communication passage between said electrovalve and said main chamber comprises a subsidiary chamber communicating with said main chamber, a subsidiary shutter in said subsidiary chamber, a passage leading to said subsidiary chamber from said third connector union, and a spring biasing said subsidiary shutter against the mount of said passage leading to said subsidiary chamber from said third connector union.

4. A braking system as in claim 3, wherein said subsidiary shutter is in the form of a cup shaped body within which said biasing spring is located, a radial notch in the base of said cup shaped body, said radial notch acting as a restrictor throttle permitting the passage of a limited flow of fluid from said communicating passage leading from said third connector union, into said subsidiary chamber when said subsidiary shutter is pressed against the mouth of said communicating passageway.

* * * * *